(12) United States Patent
Glain et al.

(10) Patent No.: US 7,633,040 B2
(45) Date of Patent: Dec. 15, 2009

(54) BULK RESIN INFUSION SYSTEM APPARATUS AND METHOD

(75) Inventors: Michael L. Glain, Seattle, WA (US); Dennis J. Hanks, Enumclaw, WA (US); Andrew E. Modin, Enumclaw, WA (US); Jack A. Woods, Kent, WA (US); Timothy D. Aquino, Olympia, WA (US)

(73) Assignee: The Boeing Company, Chicago, IL (US)

( * ) Notice: Subject to any disclaimer, the term of this patent is extended or adjusted under 35 U.S.C. 154(b) by 264 days.

(21) Appl. No.: 11/271,965

(22) Filed: Nov. 14, 2005

(65) Prior Publication Data

US 2007/0108665 A1    May 17, 2007

(51) Int. Cl.
*H05B 6/00*       (2006.01)
*B29C 45/14*     (2006.01)

(52) U.S. Cl. ................................. 219/633; 264/257
(58) Field of Classification Search .......... 156/286, 156/87, 285, 289, 309.6, 323, 382; 264/257, 264/268; 428/109–111, 114, 116
See application file for complete search history.

(56) References Cited

U.S. PATENT DOCUMENTS

| | | | | |
|---|---|---|---|---|
| 2,478,165 | A | * 8/1949 | Collins | 425/388 |
| 3,356,781 | A | * 12/1967 | Sulewski et al. | 264/137 |
| 4,622,091 | A | 11/1986 | Letterman | |
| 5,281,388 | A | 1/1994 | Palmer et al. | |
| 5,322,665 | A | 6/1994 | Bernardon et al. | |
| 6,482,497 | B1 | 11/2002 | Kay et al. | |
| 2003/0102604 | A1 * | 6/2003 | Mack et al. | 264/511 |
| 2004/0140587 | A1 * | 7/2004 | Hadley | 264/257 |
| 2004/0219855 | A1 * | 11/2004 | Tsotsis | 442/364 |
| 2004/0242836 | A1 * | 12/2004 | Hayes et al. | 528/124 |
| 2007/0090562 | A1 * | 4/2007 | Hawkins | 264/257 |

* cited by examiner

*Primary Examiner*—Quang T Van (57) ABSTRACT

A composite item is fabricated in system that includes a layer of preform, supply of resin, mandrel, and bagging film. The layer of preform corresponds to the composite item. The supply of resin is sufficient to infuse the preform. The mandrel includes a preform receiving zone to receive the layer of preform and a resin receiving zone to receive the supply of resin. The resin receiving zone is adjacent to the preform receiving zone. The bagging film is operable to generate an envelope surrounding the preform receiving zone and the resin receiving zone.

17 Claims, 7 Drawing Sheets

FIG. 8

BULK RESIN INFUSION SYSTEM APPARATUS AND METHOD

FIELD OF THE INVENTION

The present invention generally relates to a resin infusion device. More particularly, the present invention pertains to a vacuum assisted resin infusion device.

BACKGROUND OF THE INVENTION

Laminated materials such as, for example, composites are widely utilized to increase structural rigidity in a wide variety of products. For example, composites are generally utilized by the airplane construction industry to build airframes, structural members of airframes, wings, wing spars, and the like. In some of the most advanced aircraft, where high strength and rigidity and low weight are extremely important, composites may account for a significant portion of the airframe as well as the external surface or skin. Typically, these composites are constructed from a plurality of layers placed over a form. These layers are often referred to as partial or full plies. Each ply may be in the form of unidirectional fiber material, woven fibers in a fabric, braided, or a variety of other conformations. Plies of unidirectional fiber material are often placed in several direction or strand orientations such as, 0°, 90°, ±45°, and the like. The fibers may be made from any of a multitude of natural and/or "man-made" materials such as fiberglass, carbon, Kevlar®, and the like.

In a "dry layup," the plies of reinforcing material are placed on a form or mandrel and then saturated with a resin such as epoxy. If an excess of epoxy is present in the layup, the plies may expand in thickness create layers or pockets of epoxy that add weight to the layup without adding strength. However, if the plies are insufficiently saturated with epoxy, internal and/or external voids or dry areas may occur. Such anomalies may result in undesirable material strength properties and/or surface imperfections. While conventional methods and devices have been employed to overcome these issues, these conventional solutions have not been fully successful.

Accordingly, it is desirable to provide a system, apparatus and method for infusing resin into a layup that is capable of overcoming the disadvantages described herein at least to some extent.

SUMMARY OF THE INVENTION

The foregoing needs are met, to a great extent, by the present invention, wherein in one respect a system, apparatus and method is provided that in some embodiments facilitates infusing a resin into a layup.

An embodiment of the present invention relates to a mandrel and includes a preform receiving zone and a resin receiving zone adjacent to the preform receiving zone.

Another embodiment of the present invention pertains to a device for infusing a layup that includes a mandrel and bagging film. The mandrel is operable to receive the layup. The mandrel includes a preform receiving zone and a resin receiving zone adjacent to the preform receiving zone. The bagging film is operable to generate an envelope that is sealed from the atmosphere and surrounds the preform receiving zone and the resin receiving zone.

Yet another embodiment of the present invention relates to a system for fabricating a composite item. The system includes a layer of preform, supply of resin, mandrel, and bagging film. The layer of preform corresponds to the composite item. The supply of resin is sufficient to infuse the preform. The mandrel includes a preform receiving zone to receive the layer of preform and a resin receiving zone to receive the supply of resin. The resin receiving zone is adjacent to the preform receiving zone. The bagging film is operable to generate an envelope that is sealed from the atmosphere and surrounds the preform receiving zone and the resin receiving zone.

Yet another embodiment of the present invention pertains to an apparatus for infusing a liquidus resin into a fibrous layer to fabricate an item. The apparatus includes a means for positioning a quantity of resin on a mandrel adjacent to the fibrous layer. The quantity of resin is sufficient to infuse the fibrous layer. The apparatus further includes a means for generating an amount of compressive force on the resin and a means for reducing the viscosity of the resin. The reduced viscosity resin is infused into the fibrous layer in response to the compressive force exceeding a resistance of the resin.

Yet another embodiment of the present invention relates to a method of infusing a liquidus resin into a fibrous layer to fabricate an item. In this method, a quantity of resin is positioned on a mandrel adjacent to the fibrous layer. The quantity of resin is sufficient to infuse the fibrous layer. In addition, an amount of compressive force is generated on the resin and the viscosity of the resin is reduced. The reduced viscosity resin is infused into the fibrous layer in response to the compressive force exceeding a resistance of the resin.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

The present invention provides a vacuum assisted bulk resin infusion (BRI) system, device, and method. In some embodiments, the BRI system includes a form or mandrel to retain a layup. The layup includes at least one ply of preform, parting film, and infusion media. The BRI system includes a membrane that is sealed from the atmosphere or substantially gas impermeable membrane that envelopes the layup. In response to a pressure differential across the membrane, compressive force is exerted upon the layup. This process is typically referred to as "vacuum bagging." However, increasing ambient pressure outside the envelope may also be utilized. The term, "bulk resin infusion" as used herein, refers to resin being used to infuse the preform at a relatively higher flow rate than convention systems. In an embodiment, this higher flow rate may be achieved by disposing the resin adjacent to the preform and within the envelope. This method reduces or eliminates any tubing systems utilized to convey the resin from a holding chamber to the preform and may be used with relatively higher viscosity resins. Certain high viscosity resins exhibit material properties that may be advantageous in relatively high technology applications such as, for example, aerospace, racing, and the like.

Figure 6:
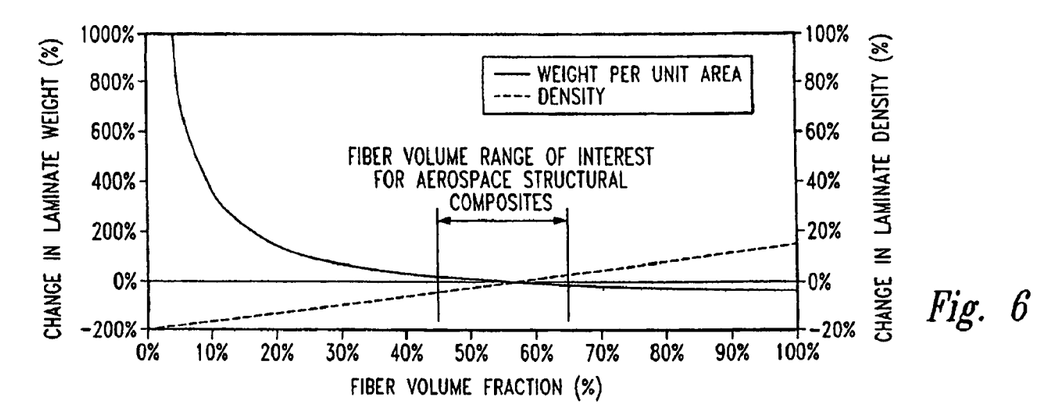
FIG. 6 is an example of a graph of fiber volume fraction (abscissa) as it affects the change in laminate weight (ordinate) according to an embodiment of the invention.
Figure 7:
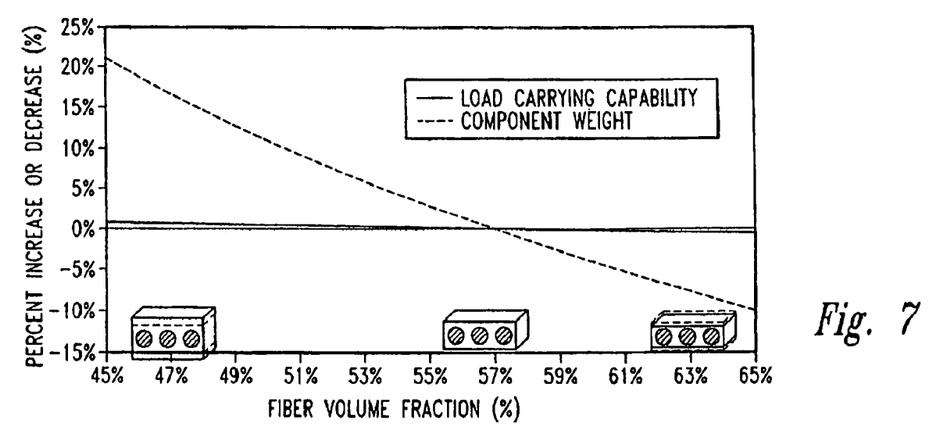
FIG. 7 is an example of a graph of fiber volume fraction (abscissa) as it affects the percent increase or decrease of item weight and load carrying weight (ordinate) according to an embodiment of the invention.

In addition, embodiments of the present invention are configured to optimize the volume of resin to fiber ratio. More particularly, as illustrated in FIGS. 6 and 7, embodiments of the invention are configured to achieve a fiber volume fraction percent of about 45% to about 65%.

Advantages of various embodiments of the invention include: (1) facilitates the use of relatively more viscous resin formulations and includes those normally applied to resin film infusion processing; and (2) decreases complexity of infusion system.

Figure 1:
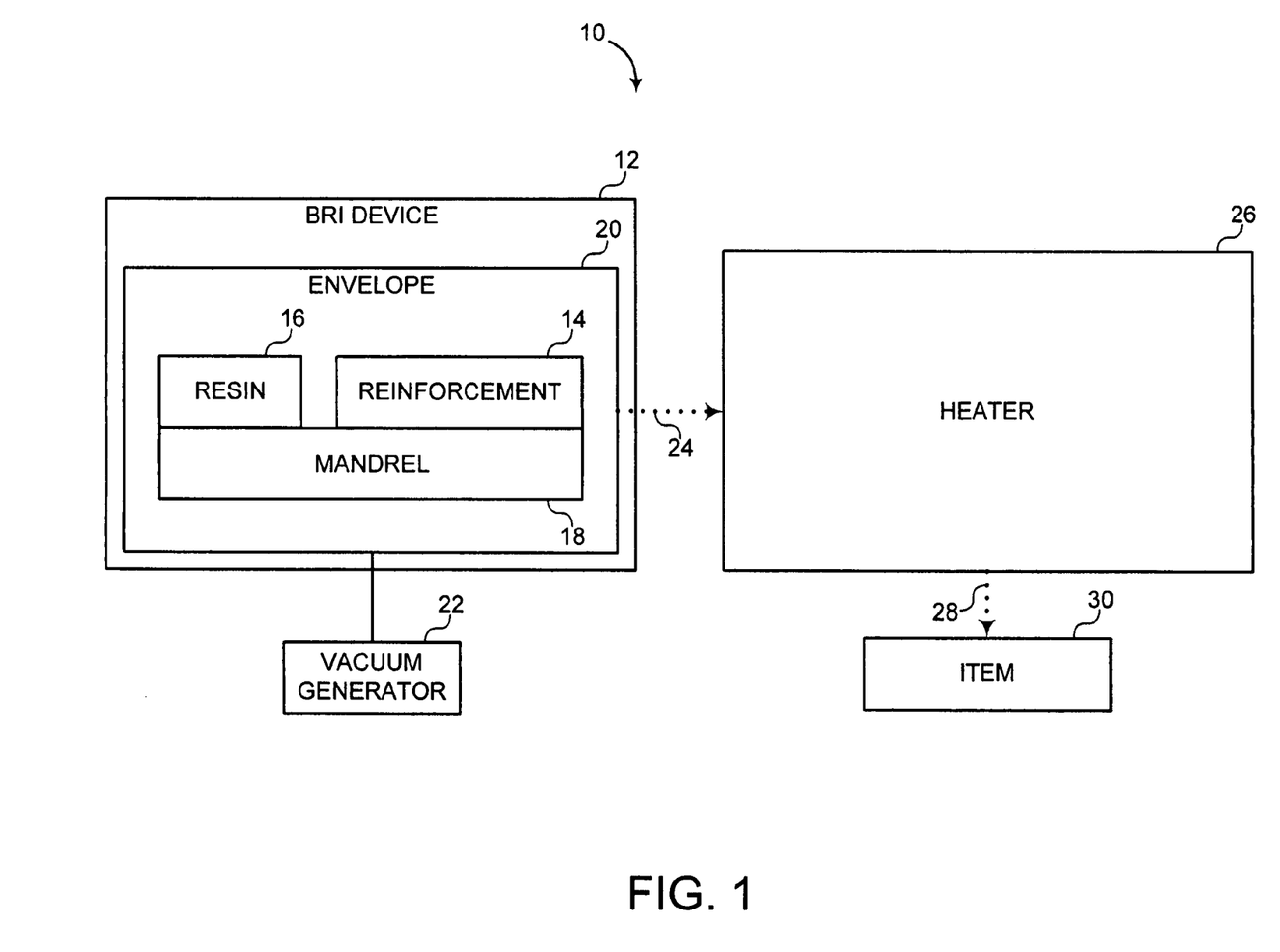
FIG. 1 is a block diagram of a bulk resin infusion system according to an embodiment of the invention.

The invention will now be described with reference to the drawing figures, in which like reference numerals refer to like parts throughout. As shown in FIG. 1, a vacuum assisted bulk resin infusion (BRI) system 10 includes a BRI device 12 to infuse a preform 14 with a resin 16. The preform 14 includes any suitable fibrous or otherwise porous reinforcing media such as, for example, any of a multitude of natural and/or "man-made" materials such as fiberglass, carbon, Kevlar®, and the like. To infuse the resin 16 into the preform 14, a pressure differential is generated across an envelope 20 such that an interior of the envelope 20 is at a relatively lower pressure than an exterior of the envelope 20. For example, a vacuum generator 22 in fluid connection with the envelope 20 may be configured to remove a portion of air and/or gasses from the envelope 20. In this manner ambient air pressure may exert a force upon the envelope 20. According to various embodiments, the resin 16 is a thermoset type resin that is cured in response to being subjected to an elevated temperature and/or pressure. In this regard, the BRI device 12 may be heated 24 by a heater 26. In a particular example, the resin 16 is substantially solid or putty-like at room temperature prior to being cured. In response to being heated to a predetermined temperature and/or for a predetermined time, viscosity of the resin 16 is, initially, reduced such that the resin 16 is operable to flow into or infuse the preform 14. In response to further elevating the temperature and/or an extended curing period, the viscosity of the resin 16 is increased and the resin 16 solidifies due to an essentially irreversible chemical polymerization reaction.

In another embodiment, the resin 16 may include a thermoplastic resin. In general, the viscosity of thermoplastic resins is too high for use in conventional infusion systems. It is an advantage of embodiments of the present invention that, in some instances, thermoplastic resins are suitable for use with the BRI system 10. More particularly, the BRI system 10 may be utilized to infuse thermoplastic resins in "C-channels" or other such relatively long, narrow items.

In various embodiments, the heater 26 is configured to raise the temperature of the resin 16 or otherwise impart thermal energy into the resin 16. The heater 26 may include any suitable heating device such as, for example, a heating element, electric blanket or other such electric device, infra red (IR) heater, oven, autoclave, and the like. In a particular example, the heater 26 is an oven having an interior volume sufficiently large to contain the BRI device 12. In another example, the heater 26 is an autoclave having a pressure chamber with sufficient volume to contain the BRI device 12 and operable to increase the temperature and/or ambient pressure within the pressure chamber. Following heating, the BRI device 12 may be removed 28 from the heater 26 or otherwise allowed to cool.

As a result of the infusion and any curing procedures, a composite item 30 is generated. The composite item 30 includes any suitable item or part such as, for example, "C-channels" and other structural members, wing spars, fuselage frames, panels, and the like.

Figure 2:
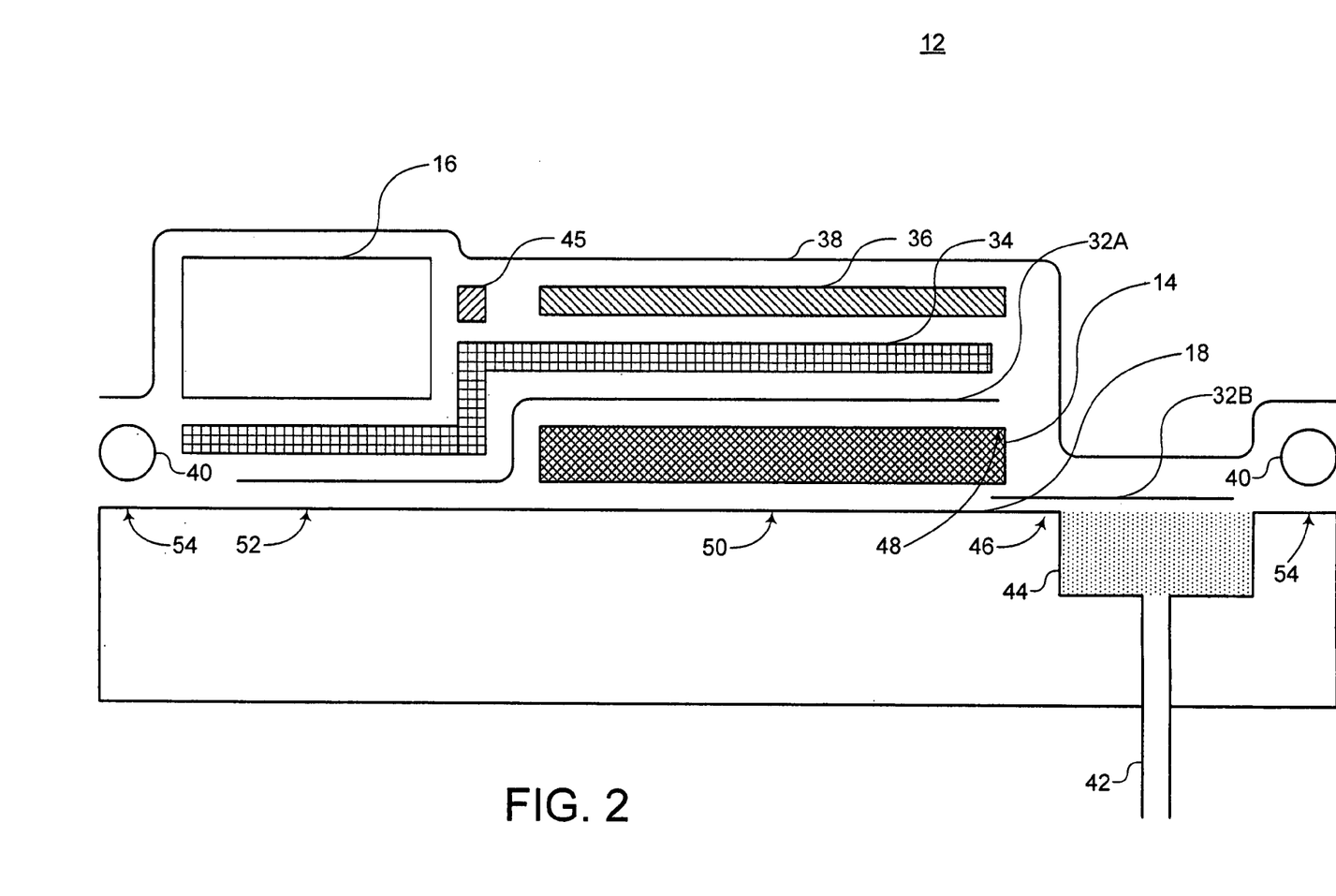
FIG. 2 is an exploded view of a bulk resin infusion device suitable for use with the bulk resin infusion system according to FIG. 1.

FIG. 2 is an exploded, cross-sectional, view of the BRI device 12 suitable for use with the BRI system 10. As shown in FIG. 2, the BRI device 12 includes the preform 14, resin 16 and the mandrel 18. In addition, the BRI device 12 includes a parting film 32A and 32B, infusion media 34, caulk plate 36, bagging film 38, sealant 40, vacuum port 42, and exit breather 44.

The parting films 32A and 32B include any suitable release film or peel ply operable to reduce adhesion of the cured item 30 to the various other components of the BRI device 12. Generally, suitable parting films include those that do not appreciably adhere to the resin 16. In addition, suitable parting films facilitate a flow of liquidus resin there across. In a particular example, the parting films 32A and 32B are a Teflon® coated woven fiberglass layer such as Armalon®. As shown in FIG. 2, the parting film 32A is disposed to cover at least a portion of the preform 14. In a particular example, the parting film 32A is "held back" from an edge of the preform 14 that is relatively close to the exit breather 44 to induce the resin 16 to flow through the preform 14. Also shown in FIG. 2, the parting film 32B is disposed to cover at least some portion of the exit breather 44 and may extend slightly under the preform 14.

The infusion media 34 facilitates flow of the resin 16 into the preform 14 from a position relatively to one side of the preform. In this regard, the infusion media 34 includes a relative coarsely woven or non-woven layer.

Figure 8:
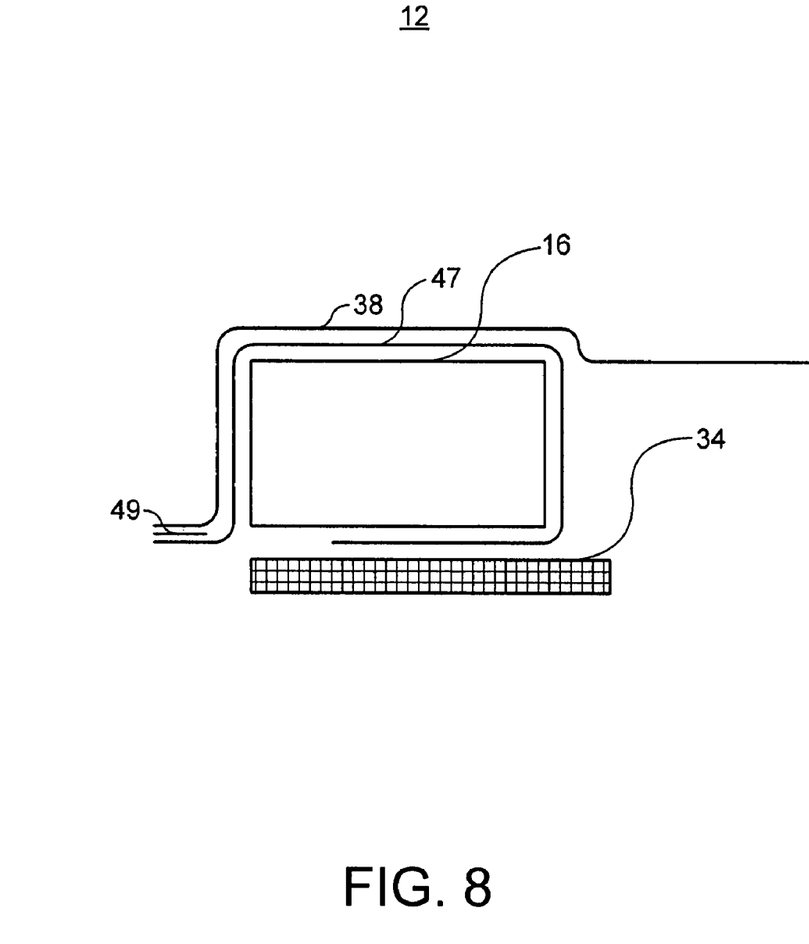
FIG. 8 is a detailed view of a resin metering device suitable for use with the bulk resin infusion system according to FIG. 1.

The caul plate 36 is optionally included to facilitate modification of surface characteristics. If present, the caul plate 36 may include a relatively stiff or rigid material having a lower surface that is drawn toward an upper surface of the preform. In this manner, the upper surface of the preform may be modified to essentially correspond to the lower surface of the caul plate 36. The caul plate 36 by its rigidity equalizes the pressure on the infusion media 34 and the preform preventing any localized wrinkling or waves in the infusion media 34 and preform during infusion. These localized anomalies can occur if the pressure within the envelope 20 equilibrates with the pressure outside the envelope 20 at a discrete location(s). In addition to or as a replacement for the caul plate 36, a rigid bar 45, can be placed along the length of the preform 34. (Length being the dimension into the page as FIG. 2 is drawn.) The bar 45 is located atop the infusion media 34 and between the resin 16 and the preform 14. The rigidity of the bar 45 meters the flow of the resin 16 into the preform 14 preventing localized loss of a net compaction pressure on the preform 14. As illustrated in FIG. 8, another form of metering device is to place the bulk resin 16 halfway atop a non-porous film 47 and the infusion media 34 and then form the film 47 around the bulk resin 16 and secure the film 47 using adhesive tape 49.

The bagging film 38 is a membrane that is substantially sealed from the atmosphere or essentially gas impermeable membrane to facilitate generating a pressure differential. That is, when sealed upon the mandrel 18, the bagging film 38 forms the envelope 20 inclosing the resin 16, preform 14, and various other components of the BRI device 12 and, to a sufficiently large extent, prevents air and/or gasses from passing therethrough. Generally, the bagging film 38 includes any suitably impermeable membrane, layer, or barrier. Suitable materials from which the bagging film may be made include plastics, rubbers, resins, and the like. Air and/or other gasses drawn from the envelope 20 generates a pressure differential that exerts a compressive force upon the contents of the envelope 20.

The sealant 40 facilitates generating a membrane that is substantially sealed from the atmosphere or substantially gas impermeable seal between the bagging film 38 and the mandrel 18. In various embodiments, the sealant 40 includes any suitable sealing material and/or method. Examples of suitable sealing materials and/or methods includes sticky, tacky and other such adhesive tapes or cordage, heat sealing, elastomeric seals, and the like. In other embodiments, the sealant 40 is optional and may be omitted. For example, the vacuum film 38 may include a reusable, self-sealing bag or other such envelope that the BRI device 12 is placed in.

The vacuum port 42 facilitates removal of some or all of the atmosphere from the BRI device 12. For example, the vacuum port 42 may be fluidly attached to the vacuum generator 22. In this manner, air and/or other gasses may be drawn from within the BRI device 12 by the vacuum generator 22.

The exit breather 44 facilitates removal of the atmosphere from the BRI device 12 by increasing the surface area from which gasses are removed via the vacuum port 42. In a particular example, the exit breather 44 includes a porous ceramic material.

To reduce any likelihood of resin being drawn into the exit breather 44, the preform 14 is held back from a choke zone 46. This choke zone 46 effectively retards the infusion process thereby allowing a near net quantity of the resin 16 to fill the preform 14. To facilitate movement of air and/or gasses from the preform 14 to the exit breather 44, the parting film 32B or other such porous release material is placed to extend from under the preform 14, at least to some extent, and across the choke zone 46 to cover most or all of the exit breather 44. To facilitate drawing the liquidus resin 16 from the infusion media 34 and into the preform 14, the BRI device 12 includes a dead zone 48. By holding the infusion media 34 and the parting film 32A back a suitable distance from an edge of the preform 14, the flow front of liquidus resin 16 is forced into the choke zone 46 after fully or essentially completely filling the preform. In this manner, premature cessation of infusion, caused by the movement of the resin 16 into the choke zone 46 prior to complete infusion of the preform 14, is substantially eliminated.

To prepare the BRI device 12 for operation, the various components of the BRI device 12 are positioned, one upon the other in a manner similar to that illustrated in FIG. 2. In operation, the BRI device 12 includes the envelope 20 (See FIG. 1) that surrounds the preform 14, resin 16, and various layers. Gasses are drawn from the envelope 20 via the exit breather 44 and a depressurized area is formed within the envelope 20. Any ambient pressure present outside of the envelope 20 acts to press the bagging film 38 upon the components within the envelope 20. Resilience and any interstitial spaces within the preform 14, infusion media 34 tend to resist this compressive force. Upon sufficient reduction in the viscosity of the resin 16 and due to a delta pressure across the preform 14, the resin 16 is forced into the infusion media 34, across the parting film 32A and into the preform 14.

Figure 3:
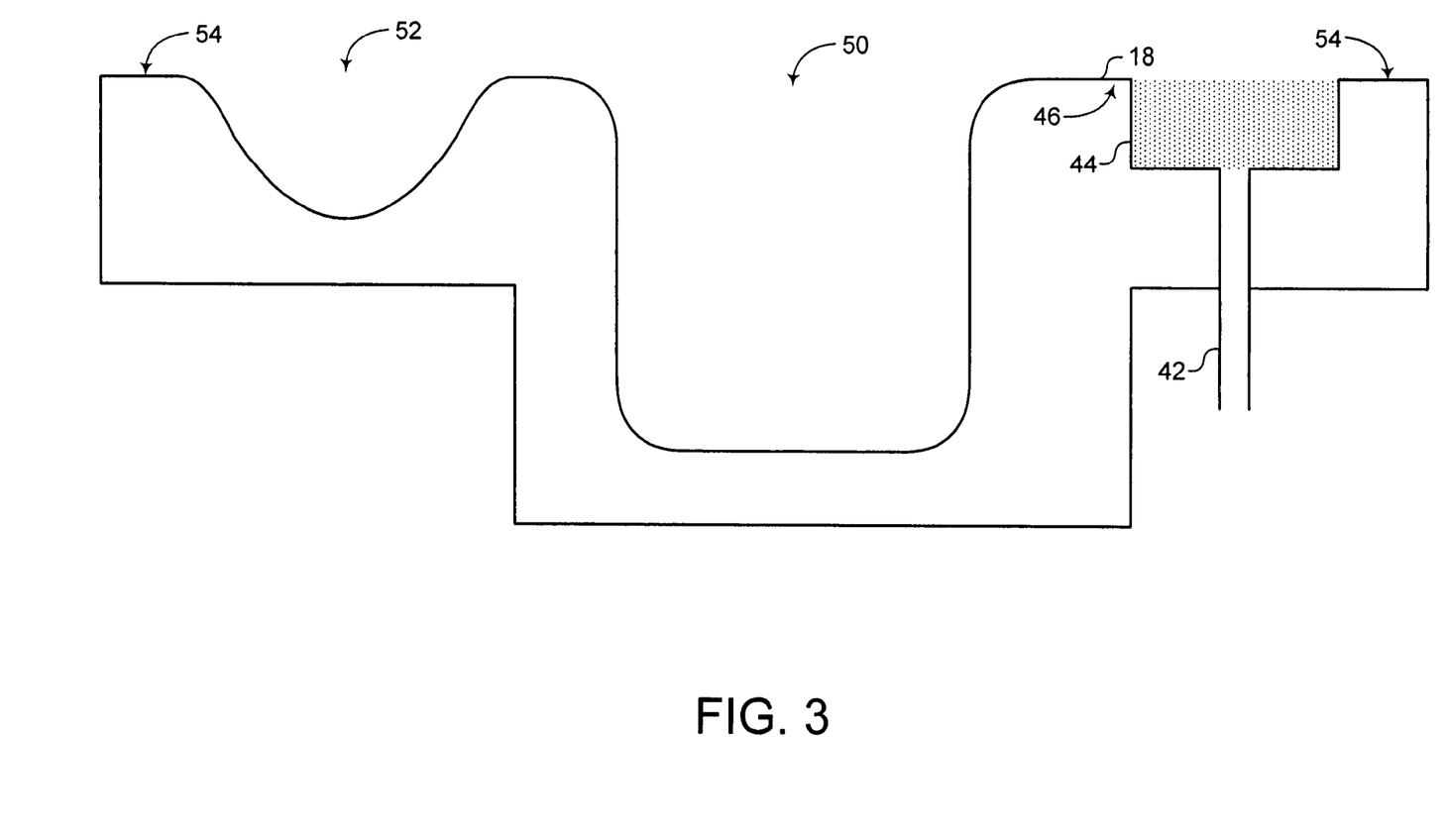
FIG. 3 is a cross-sectional view of a mandrel suitable for use with the bulk resin infusion system according to FIG. 1.

FIG. 3 is a cross-sectional view of the mandrel 18 suitable for use with the BRI system 10 according to FIG. 1. The mandrel 18 of FIG. 3 is similar to the mandrel 18 of FIG. 2, and thus, in the interest of brevity, those items described in FIG. 2, will not be described again in FIG. 3. As shown in FIG. 3, the mandrel 18 includes the preform zone 50 that corresponds to the item 30. More particularly, the item 30 is a "C" channel and the preform zone 50 includes a female mold that corresponds to the "C" channel profile. In addition, the mandrel 18 includes the resin zone 52 that includes a concavity or depression to facilitate retaining the resin 16 prior to and/or during infusion of the preform 14.

Figure 4:
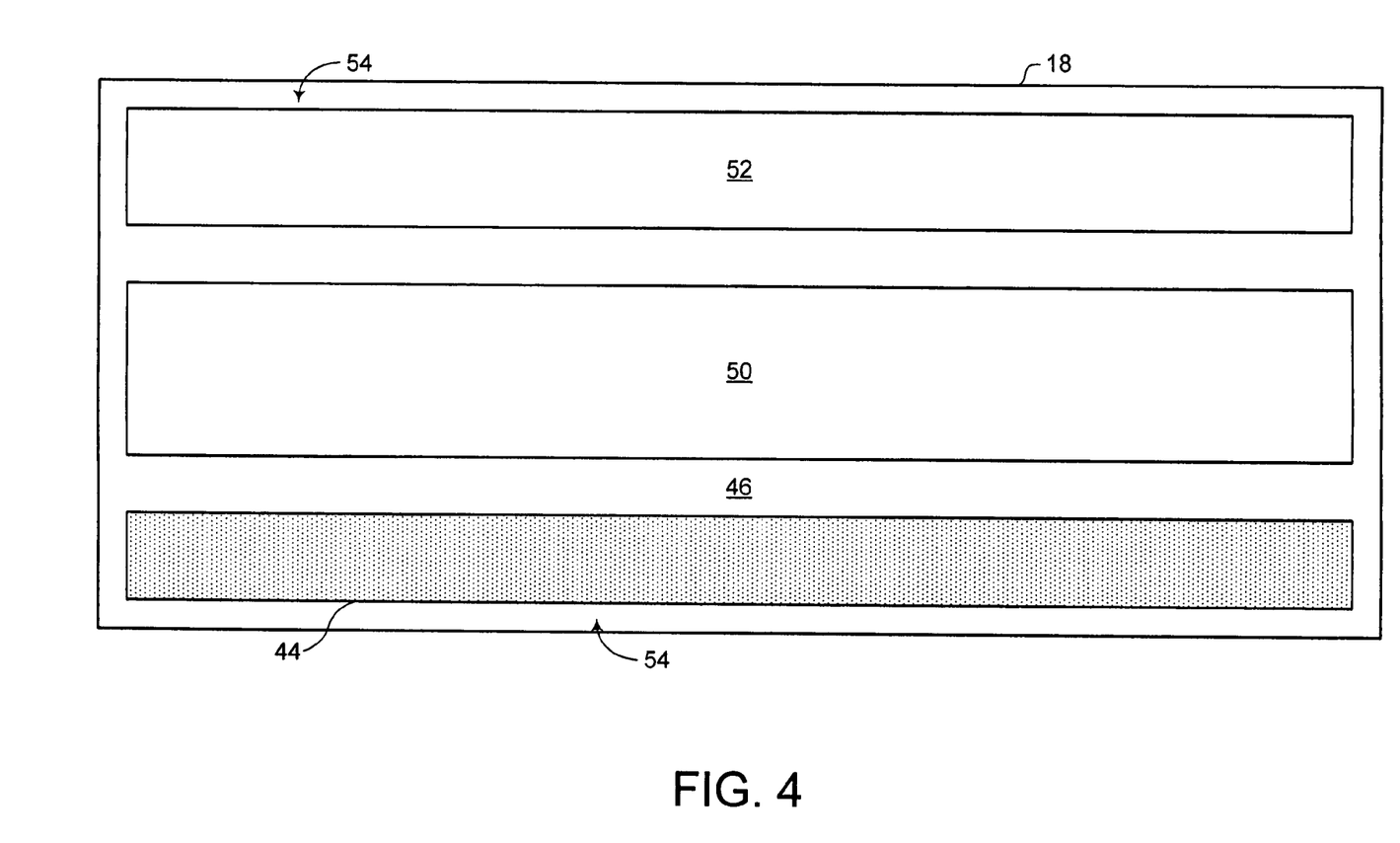
FIG. 4 is a top view of the mandrel 18 suitable for use with the BRI system 10 according to FIG. 1.

FIG. 4 is a top view of the mandrel 18 suitable for use with the BRI system 10 according to FIG. 1. The mandrel 18 of FIG. 4 is similar to the mandrel 18 of FIGS. 2 and 3, and thus, in the interest of brevity, those items described in FIGS. 2 and 3, will not be described again in FIG. 4. As shown in FIG. 3, the mandrel 18 includes the preform zone 50 that corresponds to the item 30. More particularly, preform zone 50 is relatively long to facilitate fabrication of the item 30. In addition, the resin zone 52 abutting the preform zone 50 includes a similar length to facilitate infusion of the resin 16 into the preform 14. Furthermore, the exit breather 44 optionally includes a length similar to the preform zone 50 to facilitate a relatively even draw of air and/or gasses from the envelope 20 and, thus, a relatively even flow of the resin 16 across and into the preform 14.

Figure 5:
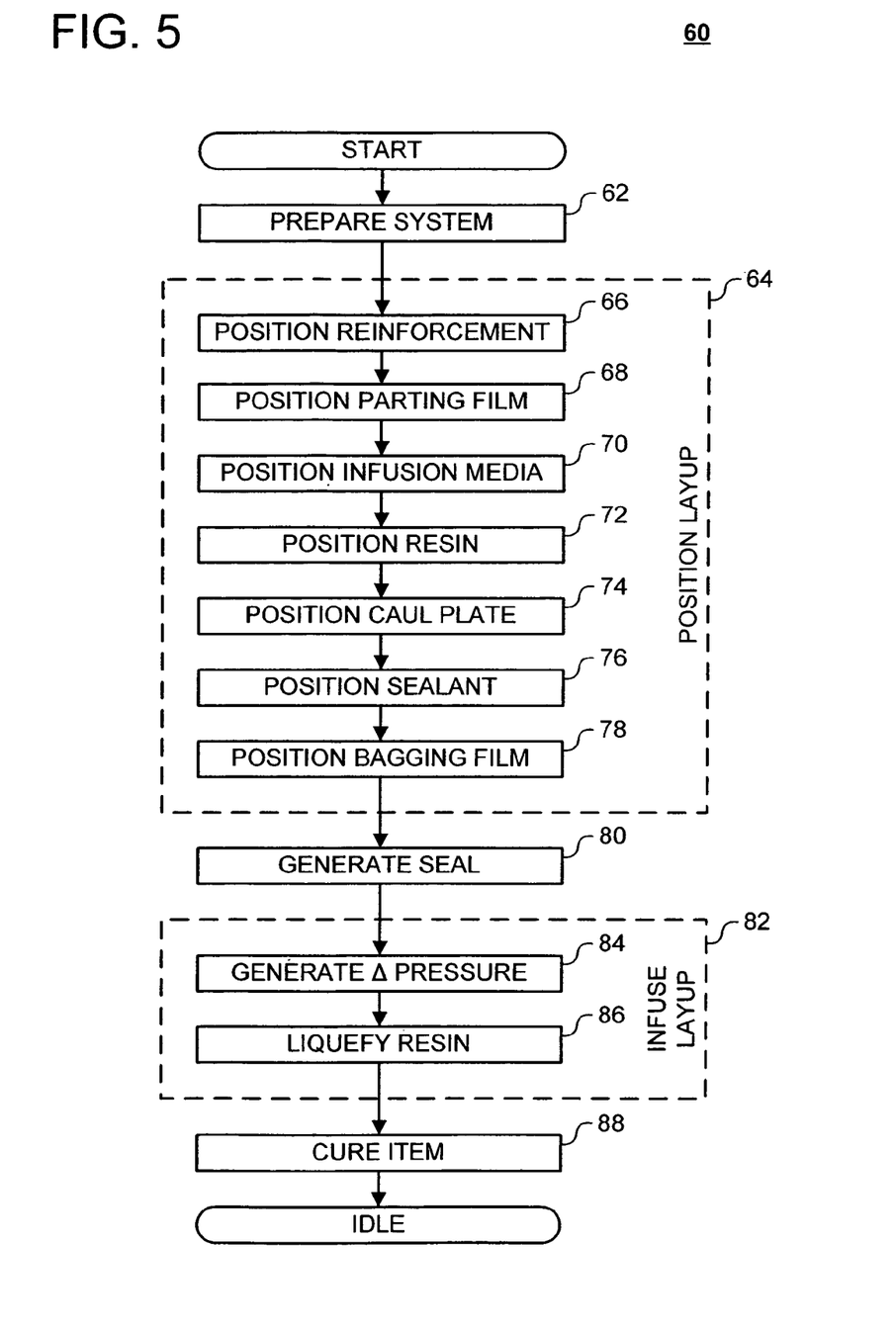
FIG. 5 is a flowchart illustrating steps that may be followed in accordance with an embodiment of the method or process.

FIG. 5 illustrates steps involved in a method 60 of infusing the preform 14 with the resin 16 to fabricate the item 30. Prior to the initiation of the method 60, the item 30 is designed and a series of computer readable instructions specifying attributes of the composite product is generated. These instructions are utilized to generate the mandrel 18. In addition, the various components of the BRI system 10 are gathered and prepared for the infusion process. The following steps 62 to 88 need not be performed as illustrated herein, but rather, may be performed in any suitable order. In this regard, it is the relative juxtaposition of components that conveys functionality to the BRI system 10, and not the order of positioning.

At step 62, the BRI system 10 is prepared. For example, the mandrel 18 may be prepared for the infusion process by applying a release coating to any surfaces that may come into contact with the resin 16. In addition, vacuum lines may be attached to the exit port 42 and vacuum generator 22.

At step 64, the layup is positioned. In general, positioning the layup includes positioning the preform 14 and the various other layers on or in a designated surface of the mandrel 18. In addition, the resin 16 may be positioned at step 64 or another step. More particularly, steps 66 to 78 describe procedures performed during layup positioning.

At step 66, the preform 14 is positioned. For example, one or more plies or layers of fibrous material are placed on the preform zone. The plies may include fabric, unidirectional, and/or non-woven fibrous material. The material of the fibers may include glass, carbon, Kevlar®, polymers, aramid, and/or other such fibers. In addition, the plies may include strips that are, themselves, woven prior to or during placement on the mandrel 18.

At step 68, the parting film 32 is positioned. For example, the parting film 32 is disposed upon the preform 14 and at a least a portion of the exit breather 44. The parting film 32 may additionally be disposed upon some portion of the resin zone and/or some portion of the mandrel 18 intervening between the preform zone 50 and the resin zone 52.

At step 70, the infusion media 34 is positioned. For example, the infusion media 34 may be positioned so as to cover some portion of the preform 14. In a particular example, the dead zone 48 is generated by leaving a relatively narrow portion of the preform 14 uncovered by the infusion media 34. In this manner, a flow of the resin 16 across the infusion media 34 may be directed into the preform 14. The infusion media 34 may further be disposed upon some portion or abutting the resin zone 52. In this manner, the infusion media 34 may facilitate transport of the resin 16 from the resin zone 52, across the preform 14, and towards the exit breather 44.

At step 72, the resin 16 is positioned. For example, the resin 16 is positioned upon the resin zone 52. It is an advantage of various embodiments of the invention that, the position of the resin 16 adjacent to the preform 14 facilitates the use of a broad range of resins, including those that are too viscous for use in conventional vacuum bagging systems. It is another advantage of various embodiments that, by placing the resin adjacent to the preform 14, rather than below, above, and/or within the preform 14, melting the resin 16 does not result in a re-arrangement and/or wrinkling of the preform 14.

At step 74, the caul plate 36 is optionally positioned. If utilized, the caul plate 36 is disposed relatively above the preform 14 and tends to reduce surface irregularities. In other instances, the caul plate 36 does not appreciable reduce surface irregularities, and thus, may be omitted.

At step 76, the sealant 40 is positioned. For example, a sticky, tacky, or adhesive ribbon or cord-like material may be disposed about a perimeter of the mandrel 18.

At step 78, the bagging film 38 is positioned. For example, the bagging film 38 may be disposed to extend to or beyond the sealant 40.

At step 80, the seal is generated. For example, sufficient force is placed upon the bagging film 38 to form a seal between the bagging film 38 and the sealant 40 and/or between the sealant 40 and the sealant zone 54 of the mandrel 18.

At step 82, the layup is infused. In general, infusion occurs in response to the pressure exerted by the bagging film 38 overcome the resistance of the resin 16 to flowing through the various layers of the layup. More particularly, infusion occurs in response to the following steps.

At step 84, a pressure differential is generated. For example, some portion of the air and/or gasses within the envelope 20 may be removed and/or the ambient pressure outside of the envelope 20 may be increased. More particularly, the vacuum generator 22, in fluid connection with the vacuum port 42, may be utilized to remove some portion of the air and/or gas within the envelope 20. In various embodiments, the exit breather 44 provides a greatly increased surface area and/or elongated conduit for removal of air and/or gasses. In addition, the BRI device 12 is optionally placed in a pressure vessel such as, for example, an autoclave that facilitates increasing the ambient pressure. In this regard, the heater 26 may include an autoclave to heat the resin 16 and provide an increased ambient pressure.

At step 86, the resin 16 is liquefied. For example, sufficient heat is applied to the resin 16 to reduce the viscosity of the resin 16. In various embodiments, heat may be applied to the resin 16 and/or the BRI device 12 by, for example, placing the BRI device 12 in the heater 26, activating a heating element, and the like. The heating element, if present, may include a resistive heating element disposed within or below some portion of the mandrel 18, an infra red heater directed at the resin 16 and/or some portion of the mandrel 18, or the like. In another embodiment, the resin 16 is sufficiently liquidus that heating may be omitted. For example, a liquidus resin may be poured into a bowl or trough-shaped resin zone such as the resin zone 52 illustrated in FIG. 3.

At step 88, the item 30 is cured. Various resin formulations employ a variety of methods for chemical hardening or polymerization. For example, a group of resins broadly classified as thermoresins or thermoset resins are polymerized by heating. In this regard, sufficient heat and/or pressure is applied the infused resin 16 to facilitate a chemical reaction or polymerization in the resin 16. In other instances, the resin 16 may be polymerized by the addition of a hardener or catalyst. Once mixed with the catalyst, the resin will polymerize given sufficient time. Thus, in another example, sufficient time is allowed to transpire to facilitate polymerization.

Following the method 60, the item 30 may be removed from the BRI device 12 and parted from the layup. Optionally, the item 30 may be finished. Finishing may encompass sanding, polishing, milling, cleaning, or the like.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for infusing a resin into a fibrous layer to fabricate an item, the apparatus comprising:

means for positioning a quantity of resin on a mandrel adjacent to a side of the fibrous layer, wherein the quantity of resin is sufficient to infuse the fibrous layer;

means for generating an amount of compressive force on the resin by disposing a bagging film over the resin and the fibrous layer and generating delta pressure across the bagging film; and means for reducing the viscosity of the resin, wherein the reduced viscosity resin is infused into the fibrous layer in response to the compressive force exceeding a resistance of the resin.

2. The apparatus according to claim 1, further comprising: means for heating the resin to reduce the viscosity of the resin.

3. The apparatus according to claim 1, further comprising: means for curing the infused resin to fabricate the item.

4. The apparatus according to claim 1, further comprising:
means for metering resin flow into the fibrous layer.

5. A method of infusing a resin into a fibrous layer to fabricate an item, comprising:
positioning a quantity of resin on a mandrel adjacent to a side of the fibrous layer, wherein the quantity of resin is sufficient to infuse the fibrous layer;
generating an amount of compressive force on the resin by disposing a bagging film over the resin and the fibrous layer and generating delta pressure across the bagging film; and
reducing the viscosity of the resin, wherein the reduced viscosity resin is infused into the fibrous layer in response to the compressive force exceeding a resistance of the resin.

6. The method according to claim 5, further comprising:
heating the resin to reduce the viscosity of the resin.

7. The method according to claim 5, further comprising:
curing the infused resin to fabricate the item.

8. A method of infusing a resin into a fibrous layer to fabricate an item, comprising:
preparing an infusion system, the infusion system including a mandrel having a resin receiving portion disposed adjacent to a side of a reinforcement receiving portion;
positioning the fibrous layer on the reinforcement receiving portion;
disposing a parting film on the fibrous layer;
disposing an infusion media on the parting film;
disposing the resin on the resin receiving portion, wherein the resin is substantially puttylike initially;
disposing a caul plate on the infusion media;
disposing a sealant encircling the resin receiving portion and reinforcement receiving portion;
disposing a bagging film over the caul plate, resin, and sealant;
generating a seal between the bagging film and sealant;
generating delta pressure across the bagging film;
liquefying the resin, wherein the delta pressure urges the liquefied resin to infuse the fibrous layer; and
curing the infused item.

9. The method according to claim 8, further comprising:
heating the resin, wherein the resin is liquefied in response to heating.

10. A method of infusing a resin into a layup to fabricate an item, comprising:
preparing an infusion system, the infusion system including a mandrel having a resin receiving portion disposed adjacent to a side of a reinforcement receiving portion;
disposing the layup on the reinforcement receiving portion, the layup including a reinforcement layer and a bagging film;
disposing the resin on the resin receiving portion;
disposing a bagging film over the layup such that the bagging film surrounds the reinforcement receiving portion and the resin receiving portion;
generating a seal between the bagging film and sealant;
infusing the resin into the layup by generating a pressure differential across the bagging film and liquefying the resin; and
curing the infused item.

11. The method according to claim 10, further comprising:
heating the resin, wherein the resin is liquefied in response to heating.

12. The method according to claim 10, wherein the step of disposing the layup further comprises:
disposing a fibrous layer on the reinforcement receiving portion;
disposing a parting film on the fibrous layer; and
disposing an infusion media on the parting film.

13. The method according to claim 10, wherein the step of disposing the layup further comprises:
disposing a caul plate on the infusion media.

14. The method according to claim 10, further comprising:
disposing the sealant encircling the resin receiving portion and reinforcement receiving portion.

15. The method according to claim 10, further comprising:
metering resin flow into the infusion media.

16. The method according to claim 10, wherein the step of metering the flow of resin into the infusion media comprises at least one of the following:
placing a bar between the resin and the fibrous layer;
enveloping the resin partially in a non-porous film prior to disposing the bagging film over the layup.

17. An apparatus for infusing a resin into a fibrous layer to fabricate an item, the apparatus comprising:
means for positioning a quantity of resin on a mandrel adjacent to the fibrous layer, wherein the quantity of resin is sufficient to infuse the fibrous layer;
means for generating an amount of compressive force on the resin by disposing a bagging film over the resin and the fibrous layer and generating delta pressure across the bagging film;
means for metering resin flow into the fibrous layer; and
means for reducing the viscosity of the resin, wherein the reduced viscosity resin is infused into the fibrous layer in response to the compressive force exceeding a resistance of the resin.

* * * * *

UNITED STATES PATENT AND TRADEMARK OFFICE
CERTIFICATE OF CORRECTION

PATENT NO. : 7,633,040 B2 Page 1 of 1
APPLICATION NO. : 11/271965
DATED : December 15, 2009
INVENTOR(S) : Glain et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 660 days.

Signed and Sealed this

Second Day of November, 2010

David J. Kappos
*Director of the United States Patent and Trademark Office*